US008035052B2

(12) United States Patent
De La Ballina et al.

(10) Patent No.: US 8,035,052 B2
(45) Date of Patent: Oct. 11, 2011

(54) METHOD AND APPARATUS FOR VISIOMETRIC IN-LINE PRODUCT INSPECTION

(75) Inventors: Helios De La Ballina, Aubin (FR); Emmanuel Dumas, Villefranche de Rouergue (FR)

(73) Assignee: De La Ballina Freres, Maleville (FR)

( * ) Notice: Subject to any disclaimer, the term of this patent is extended or adjusted under 35 U.S.C. 154(b) by 224 days.

(21) Appl. No.: 12/382,933

(22) Filed: Mar. 26, 2009

(65) Prior Publication Data
US 2009/0245616 A1    Oct. 1, 2009

(30) Foreign Application Priority Data
Mar. 26, 2008  (FR) ...................................... 08 01638

(51) Int. Cl.
*B07C 5/00* (2006.01)
*G01B 11/02* (2006.01)
(52) U.S. Cl. ......... 209/579; 209/586; 356/602; 356/606
(58) Field of Classification Search ................. 209/551, 209/576, 579, 586, 587; 356/602, 606, 631
See application file for complete search history.

(56) References Cited

U.S. PATENT DOCUMENTS

| 3,187,185 | A | * | 6/1965 | Milnes | 250/222.1 |
| 4,188,544 | A | * | 2/1980 | Chasson | 250/559.06 |
| 4,450,352 | A | * | 5/1984 | Olsson | 250/223 R |
| 4,456,379 | A | * | 6/1984 | Schumann et al. | 356/631 |
| 4,650,333 | A | * | 3/1987 | Crabb et al. | 356/606 |
| 4,962,538 | A | * | 10/1990 | Eppler et al. | 382/141 |
| 6,618,155 | B2 | * | 9/2003 | Metcalfe et al. | 356/625 |
| 7,353,954 | B1 | * | 4/2008 | Malek et al. | 209/542 |

* cited by examiner

*Primary Examiner* — Joseph C Rodriguez
(74) *Attorney, Agent, or Firm* — Oliff & Berridge, PLC

(57) ABSTRACT

A method and an apparatus for grouping individual products such as industrially baked products that travel past a visiometry station into lots for counting them. In a viewing zone of a conveyor belt, a laser triangulation visiometry system is used. The method and apparatus also uses a signal processor associated with the camera that deduces from the images acquired thereby at least one piece of information on the location of the products on the conveyor belt as well as height information thereon. This information is then used by the signal processor to automatically distinguish between the presence of a product and the presence of contaminating material (for example flour or chocolate particles) on the conveyor belt and to distinguish the presence of several partially or fully overlapping products from the presence of a single product on said conveyor belt. Preferably, two cameras are disposed symmetrically relative to a laser plane substantially perpendicular to the plane of the viewing zone.

8 Claims, 4 Drawing Sheets

METHOD AND APPARATUS FOR VISIOMETRIC IN-LINE PRODUCT INSPECTION

Figure 1:
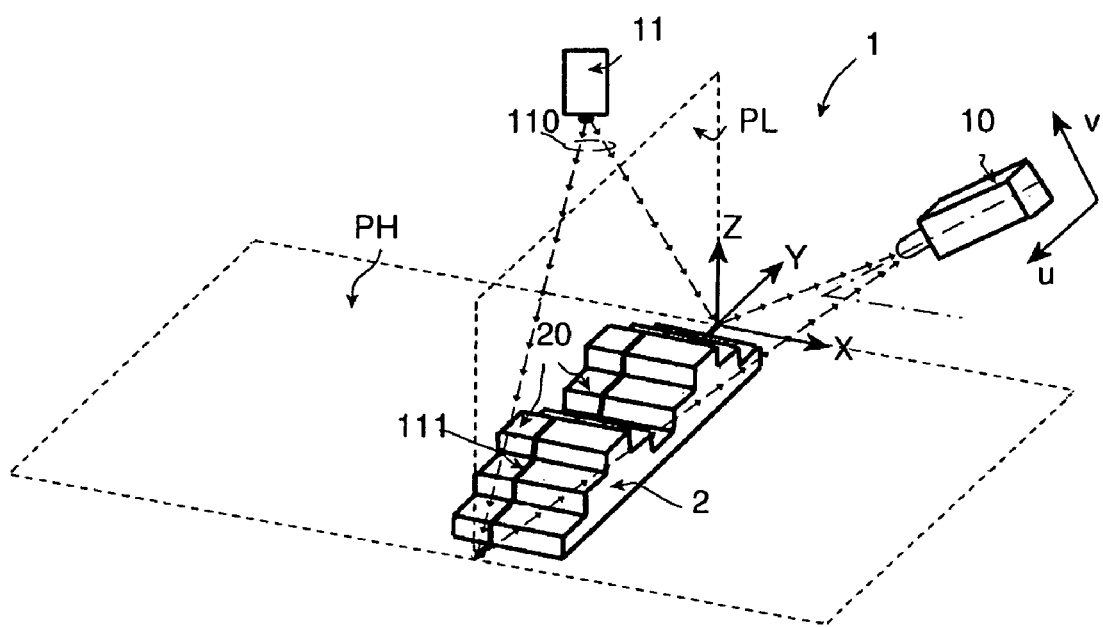

The invention relates to the inspection of individual products traveling on a conveyor belt in the context of packaging these products in lots at the end of an industrial production line. It applies in particular to the field of industrial baking, or to any similar situation where the goal is to sort the products after they have been baked or deep-frozen to distributed them into various packaging lots each containing a given number of products. Depending on the apparatus, the product counting operations for grouping them into lots may, or may not, be combined with simultaneous quality control operations.

The case of industrially baked products is a typical area in which, traditionally, products placed on a conveyor belt are inspected by having them pass by a visiometry station equipped with an image acquisition camera associated with electronic image-processing means to provide sorting operation control signals directly as they leave the visiometry station. It is also a good example for illustrating situations where the problems the invention sets out to solve occur, particularly responding to the increasing need for high processing rates, the desire to reduce the apparatus size, and the quest for high control reliability and increasingly accurate counting for full satisfaction of the customers to whom the packed lots are delivered.

Systems for packaging industrially baked products that count the products with a view to grouping them into preset quantities already exist. Such a system is described for example in French Patent 03 11649, published under reference FR 2,860,581, or in the corresponding US Patent Application 2005/09960. It has a visiometry inspection station for the products passing by, upstream of a lot-sorting station and digital image processing means providing counting or numbering information according to their location on the surface of the conveyor belt which control the raising or lowering of various teeth of a sorting comb located across the conveyor belt, to selectively allow the counted products to pass by and add to a lot that is being made up. The image processing is done by contrast analysis to distinguish between the products present on the surface of the conveyor belt.

It is a goal of the claimed invention to further improve the lot grouping conditions and to perfect counting to the full satisfaction of the customers purchasing lots, despite the fact that the products—croissants, loaves, or others—are generally randomly distributed on the conveyor belt in highly variable directions and often with one product overlapping another, which falsifies the counting results. Moreover, the products are often accompanied by foreign materials such as flour or chocolate nuggets, or any similar material involved in their manufacture. These materials gradually build up on the conveyor belt and interfere with image capture and interpretation. In particular, they prevent back-lighted inspections done through a translucent conveyor belt and require the operating conditions of the system to be frequently adjusted.

To remedy the drawbacks of the prior art, particularly those cited above, the present invention essentially makes use of three-dimensional information involving a height profile of the products moving by on the conveyor belt. For this purpose, a so-called laser triangulation visiometry system is used in which a camera is oriented to capture, at a non-zero angle, the image of a line of light traced in its viewing field by a lamellar beam of laser light. In fact, laser triangulation visiometry systems are known of themselves, for gathering volume information on the objects inspected. A detailed description may be found, in particular, in U.S. Pat. No. 4,188,544.

However, the means that are known of themselves are useful in the context of the present invention by fundamentally different dispositions, being directed not at three-dimensional inspection but at counting the products as they move by. A further goal, where applicable, is to count the products when they are resting on a support from which they are poorly, unreliably, and irregularly distinguished by contrast.

According to the invention, the visiometry station is equipped to cause the products moving on the conveyor belt to pass under a line of light projected by a lamellar laser beam transversely to the travel direction of the conveyor belt observed by means of a camera at a non-zero angle so as to be sensitive to said line of light as deformed by the presence of products on the conveyor belt. The associated electronic image processing means are configured to deduce, from the acquired images, height information on the products present on the belt in combination with information on their location on the belt, to compare said information with a maximum height threshold above the belt, predetermined in correspondence with a nominal height of the individual products, and, when said height information is greater than said maximum threshold, to deduce that for the corresponding location there are two products overlapping one another and automatically calculate the surface area of the belt over which this overlapping extends.

The counting means that control the sorting elements of the sorting station are then configured to use the data obtained by twice cumulating the overlapping surface area with the neighboring areas on which the height information is less than said maximum threshold while remaining greater than a minimum threshold signifying the presence of a product to be counted, and dividing the total by a nominal value of the area occupied by each product individually to deduce the number of products present locally on the belt. The invention disregards the case where more than two products are overlapping on a given surface area of the belt. For considerable simplification of the calculations and the means automatically carrying them out, it is assumed that this situation rarely occurs in the applications to industrial baked products and it is guaranteed that a counting error can be only in the direction of an overcount of products in the corresponding lot, which is not harmful to the customer as an error in the direction of an undercount of products relative to the expected number in each lot would be.

The maximum height threshold used is, for the same reasons, advantageously set at a value greater than the nominal height of the products by a fraction of this nominal height, for example about 20%, or more generally 15 to 30%.

According to another feature of the invention, the height information deduced from the laser triangulation inspection is continuously compared to a minimum height threshold, determined to discriminate between the presence of a product (if the height deduced from the image is greater than this threshold) and the presence of traces of a material foreign to said products, for which the height remains lower than this minimum threshold. The value of this minimum threshold is advantageously chosen according to criteria similar to those used for the maximum threshold, according in particular to the nominal height of the products to be counted. In most practical cases, the minimum height threshold may be set at between 3 and 5 millimeters to dispel any sources of error coming from the bottom of the belt on which the products rest, without it being necessary to modify its adjustment during operation of the system for grouping a given type of product into lots.

According to further features inherent in the invention in its context, although they may be known of themselves in other visiometry application areas, the visiometry system is equipped with two cameras disposed substantially symmetrically relative to the laser plan orthogonal to the plane of the viewing zone and passing by the line of light. The information acquired by the two laser triangulation cameras is used to discount the incidence of shadowed areas that inevitably appear due to the inclination of the viewing axis.

Figure 2A:
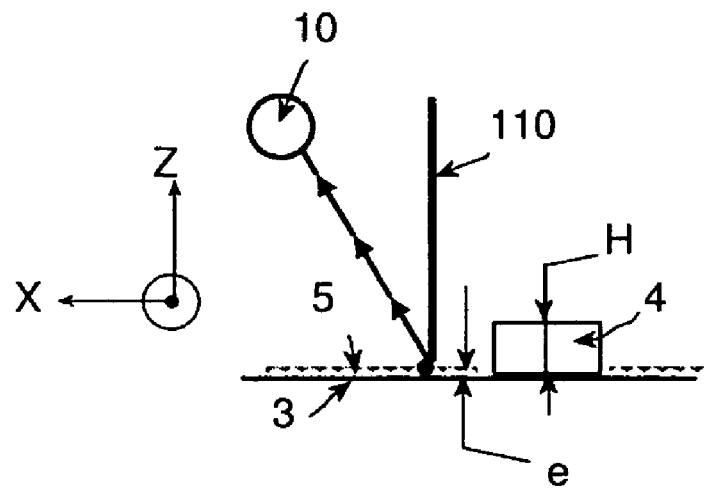
Figure 2B:
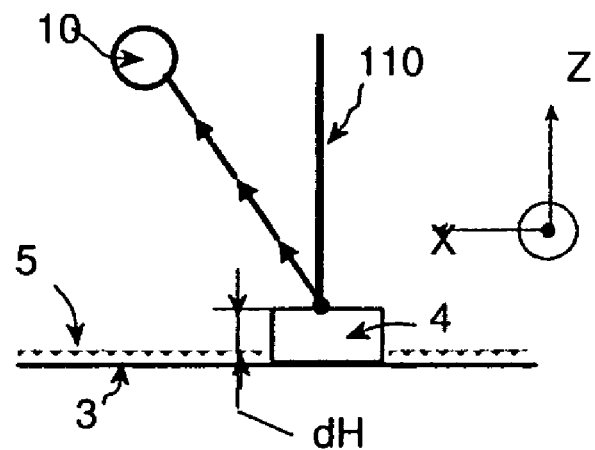
Figure 3:
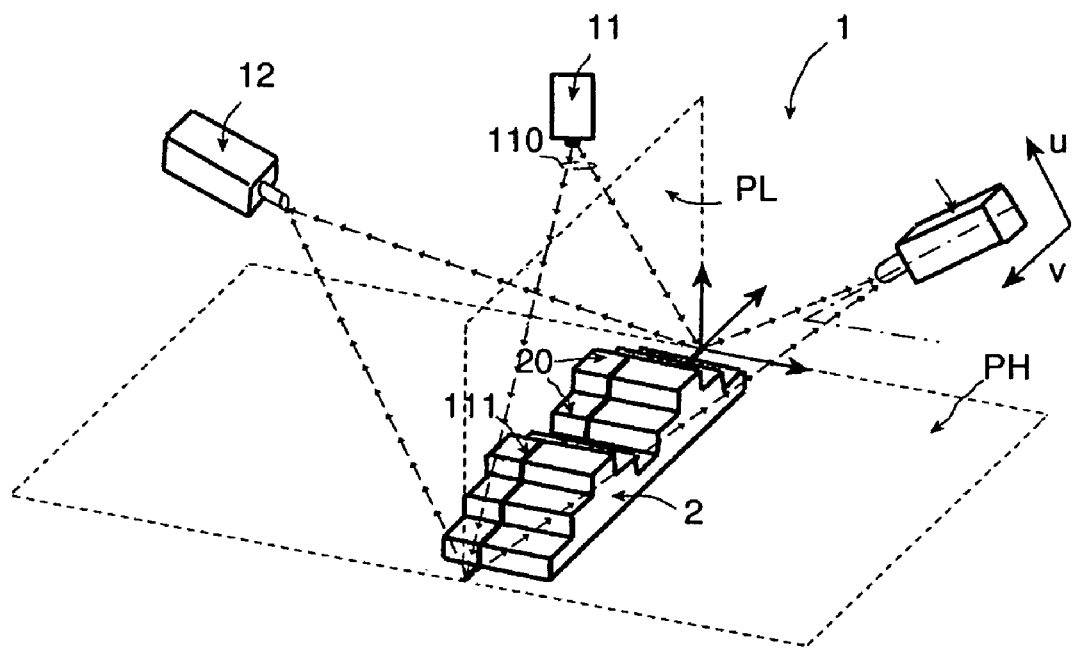
Figure 4:
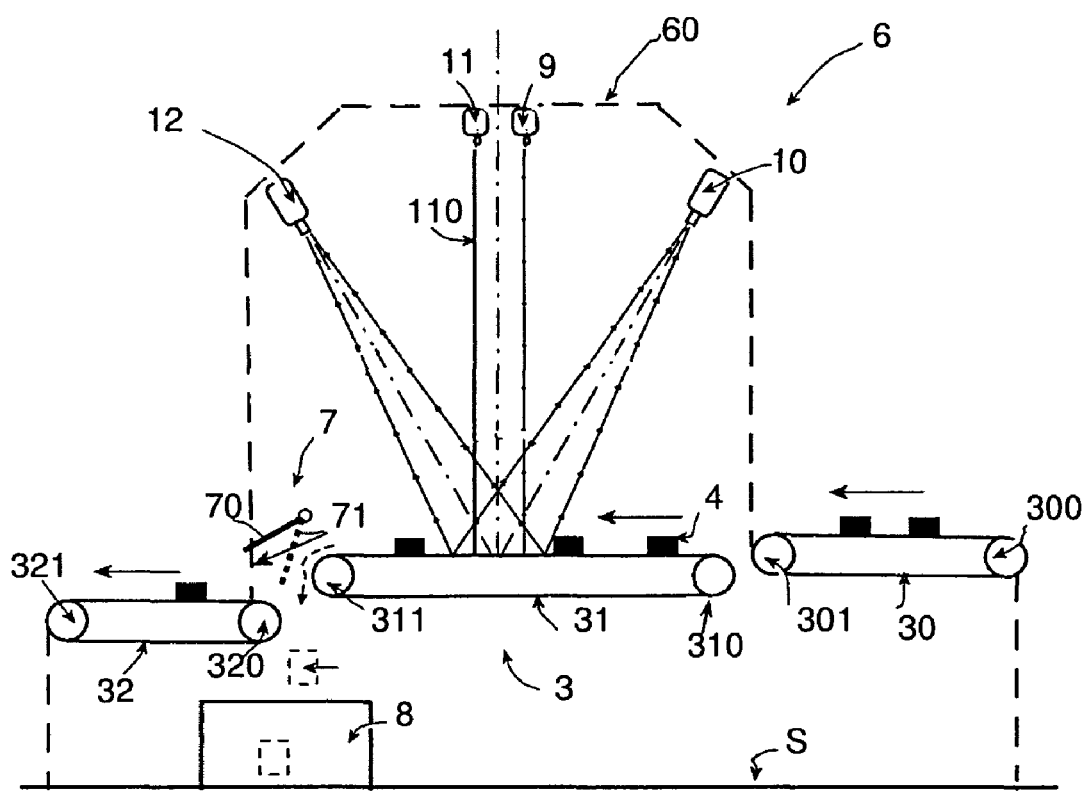

The invention will now be described in further detail with reference to the following drawings, wherein:

FIG. 1 schematically illustrates a laser triangulation visiometry system with a single camera, used in an apparatus for inspecting industrial baked products or products of similar industries according to a first embodiment of the invention;

FIGS. 2A and 2B schematically illustrate the operation of the system of FIG. 1;

FIG. 3 schematically illustrates a laser triangulation visiometry system with two cameras, used in an apparatus for inspecting industrial baked products or products of similar industries according to a second embodiment of the invention;

and FIG. 4 schematically illustrates an industrial baked product sorting apparatus employing the method according to the invention, and incorporating the two-camera laser triangulation visiometry system of FIG. 3.

The following, without in any way limiting the scope of the invention, will be in connection with its preferred application, unless stated to the contrary, namely the case of an inspection apparatus for industrial bakery products, especially rolls or cookies.

FIG. 1 schematically illustrates a laser triangulation visiometry system 1 having a camera 10 and a laser emitter 11, which will simply be called "laser" in the present description. The camera can in particular be of the type with a built-in electronic image definition map.

The laser 11 emits a lamellar beam 110 in a plane that will be called "laser plane" PL. According to the embodiment illustrated in the drawings, the plane PL is defined to be orthogonal to a plane PH, which is arbitrarily horizontal. According to the invention, the plane PH is that of a viewing zone defined on the surface of a conveyor belt 3 on which the products 4 to be inspected travel. The intersection of the lamellar beam 110 with the plane PH results in a laser line 111 that will be called "line of light" below.

The planes PL and PH and the line of light 111 thus define a trihedron XYZ which is orthonormed here. It should be noted however that the trihedron XYZ can be any trihedron without injuring the invention inasfar as the sensor of camera 10 is then configured as a consequence.

The camera 10 is disposed in space so that it can capture, in particular, the image of the line of light 111. In addition, it is inclined relative to plane PH as well as relative to plane PL. Preferably, its viewing axis V forms an angle of approximately 30 degrees relative to plane PH. As a non-limiting example, a commercial camera can be used that includes in the same housing, in addition to the appropriate optics, a matrix sensor sensitive to the wavelength of the laser 11 wave as well as signal processing circuits in the form of a single integrated circuit.

As soon as a product 4, traveling on conveyor belt 3 in a direction substantially parallel to the X axis of the trihedron defined above, passes through the line of light 111, the latter is deformed over a distance corresponding to the size of this product according to the Y axis of trihedron XYZ, and its deformation at all points is representative of the height (i.e., the size according to the Z axis of trihedron XYZ) of product 4 at all points of its transverse line illuminated by line 111.

The camera 10 acquires images of the deformed line of light, and electronic processing means of the visiometry system deduce from these images, by a triangulation method, information on the location of product 4 and a height profile at its part illuminated by laser 11. Gradually, as the conveyor belt moves by, a complete profile of the height of product 4 can be established and, by combining this profile with location information, the volume of this product can be accurately calculated.

It should be noted that, advantageously, the visiometry system is calibrated when the control apparatus of which it is a part is set up, and at regular intervals thereafter.

For this purpose, it is advantageous to use a test pattern 2 in the form of an elongate pyramid, more specifically formed of a predetermined series of plates in steps parallel to the plane PH, under a single reference numeral 20 (see FIG. 1). The pattern 2 is disposed on plane PH so that it is illuminated by the laser beam, in parallel to the Y axis. The line of light 111 deforms as the heights (Z axis) of the plates 20 change along the Y axis when the pattern 2 moves on the conveyor belt through the viewing zone. Comparison of the actual, known height of each of the plates in the pattern with the calculated height deduced from the images of the deformed line of light 111 picked up by camera 10 then enables the visiometry system to be calibrated by laser triangulation.

FIGS. 2A and 2B schematically illustrate how it is possible in this way to measure the height Z of the industrially baked products 4 reliably, accurately, and avoiding artefacts brought about by the presence of foreign material 5, or contaminant, for example flour (or chocolate particles) that becomes deposited on the conveyor belt 3 of an apparatus for inspecting these products 4, and coats the conveyor belt 3, after a variable time interval, with a more or less uniform layer with a small thickness e.

The conveyor belt 3 moves the products 4 in a direction parallel to the X axis. In FIG. 2A, the laser beam 110 illuminates the layer of flour 5. The camera 10 is then supposed to measure the thickness of the flour layer 5. In actual fact, as noted, this thickness e is very small, typically about a millimeter. Thus, a first minimum threshold S1 for a height profile is defined, typically about a few millimeters. In the main applications of the invention and as outlined above, this threshold is preferably but not imitatively about 5 mm. Everything then happens as if the line of light 111 of the laser beam were equated with the surface of the conveyor belt 3 assumed to be plane, the thickness e being deemed a background noise that is eliminated. When carried by conveyor belt 3, the product 4 passes through the lamellar laser beam 110 (FIG. 2B). The line of light 111 is then deformed to follow the variations in surface height of product 4 in two dimensions—directions X and Y—during the travel of this product on conveyor belt 3.

When the product 4 passes from the state shown in FIG. 2A to that shown in FIG. 2B, the camera 10 detects sudden deformations in the height of the line of light 111 as the leading edge of product 4 intersects this line. The camera 10 then generates signals expressing the height variations, with an amplitude dH. In practice, as thickness e is very small, it can be discounted by comparison to this amplitude, and can be deemed equal to the product height.

In other words, the measured height variation dH is actually the height H of the product being inspected 4 on the conveyor belt 3, despite the presence of a layer of flour 5. More generally, whatever the nature of the contaminant, its color, and the greater or lesser contrast in luminosity with the inspected product, there are no longer any measuring artefacts due to its presence. It can thus be seen that the invention indeed achieves one of its main goals.

The use of such a laser triangulation visiometry system thus enables to detect very accurately and reliably the area of overlapping zones of two products, in connection with the position on the conveyor belt. Let it be recalled that the purpose here is not to calculate in the whole the volume of the products present on the conveyor belt. A volume calculation would lead to a far more complicated image data processing, while in addition, that would involve the possibility of sub-counting errors, which is unforgivable. The correct calculation of the number of articles that should be gathered and collected together for each delivery lot is performed just by using the so-called minimum threshold and the so-called maximum threshold in relation with the location data and area calculations.

However, as noted in the preamble of the present description, when the inspected product has sudden shape variations, either in its contour or its upper surface such as scratches or similar shape variations, "shadow areas" appear for camera 10 because said camera is inclined relative to the conveyor belt 3 and perpendicular to the laser plane PL. In these situations, the camera 10 no longer "sees" one of the abrupt sides of the shape. In certain applications, this loss of vision is disadvantageous.

Thence, in a second embodiment, the invention offers arrangements for solving this problem. According to this embodiment, the laser triangulation visiometry system has a second camera 12 disposed symmetrically to camera 10 relative to laser plane PL.

FIG. 3A schematically illustrates the configuration of such a visiometry system. In this FIG. 3A, the elements common to the previous drawings have the same reference numerals and will not be described again unless necessary. As before, the visiometry system has a first camera 10 (playing a role entirely similar to that of the system of FIG. 1) and a laser emitter 11 projecting a laser line on plane PH, resulting in a line of light 111. Specifically, the visiometry system has a second camera 12 disposed symmetrically to the first camera 10 relative to plane PL, also inclined by an angle relative to plane PH, preferably by an angle equal to or slightly varying from 30 degrees. In such an arrangement, it clearly appears that a shadow zone not seen by one of the cameras 10 or 12 will be seen in the viewing field of the other camera.

As in the case of the first embodiment (FIG. 1), it is advantageous to carry out a phase consisting in calibrating cameras 10 and 12. For doing this, the invention provides the use of a common pattern 2, in principle identical to the pattern 2 used in the case illustrated by FIG. 1. For each camera 10 and 12, one operates as explained above. But additionally, once the two cameras 10 and 12 are individually calibrated, an additional step is executed in which the information supplied by the two cameras is correlated. According to this correlation of the invention, the calibration information is used to switch from one camera to the other as explained below.

The images of a given product 4 moving on conveyor belt 3 picked up by cameras 10 and 12 are noted IMG1 and IMG2 respectively. For one pixel of image IMG1 with coordinates [u1, v1, w1] in the trihedron UVW of camera 10, picked up by camera 10, it is desired to find the equivalent pixel of the image IMG2 picked up by camera 12. This pixel has the coordinates [u2, v2, w2] in trihedron UVW.

The prior calibration of cameras 10 and 12 and the triangulation method enable functions $(Y1, Z1)=f1(U1, W1)$ and $(Y2, Z2)=f2(U2, W2)$ to be defined respectively for passing from the "image" pixels to the "actual" geometric characteristics of the products. For each of these functions, an inverse function can be defined, respectively F1 and F2 such that $(U1, W1)=F1(X1, Y1)$ and $(U2, W2)=F2(X2, Y2)$.

For a pixel with coordinates [u1, v1, w1], the function f1 of camera 10 thus enables the element with coordinates [x1, y1, z1] corresponding to the product 4 to be found. Then, thanks to the inverse function of function F2 of camera 12, one need only find the pixel with coordinates [u2, v2, w2] corresponding to the element with coordinates [x2, y2, z2] such that $z2=z1$ and $y2=y1$ and such that $(u2, w2)=F2(x2, y2)$.

For non-zero values of w1, namely for any pixel of the image IMG1 corresponding to the elements (x1, y1, z1) not located on the shadow areas for camera 10:
  if the value w2 is zero, this means that the corresponding element (x2, y2, z2) is in a shadow area for camera 12; the value w1 is then copied into value 2,
  if the value w2 is not zero, this means that the corresponding element (x2, y2, z2) is not in a shadow area for camera 12; then, for example, the arithmetic mean of values w1 and w2 can be copied into w2.

For pixels of the image IMG1 such that w1=0, namely corresponding to elements placed on shadow areas for camera 10, it is proceeded similarly but this time using the image IMG2 as the initial image and the inverse function F1 of the calibration function f1 mentioned above. Images IMG1 and IMG2 are thus gradually merged using a single calibration tool.

It should be noted that, while the cameras 10 and 12 acquire the images in a synchronized manner, this is not the case for the reconstitution of the images line by line. As a result, due to the travel of the conveyor belt 3, a given position on said conveyor belt will have different coordinates v1 and v2 on images IMG1 and IMG2. Since acquisition of each image is synchronized to a piece of information coming from the conveyor belt 3 travel coder, the difference between the two images will be proportional to a coder step number.

The use of two cameras 10 and 12 thus does give a complete image of the product 4 moving on conveyor belt 3, avoiding any "shadow effect".

However, it must be understood that other merge algorithms could be used without departing from the framework of the invention.

Once the images IMG1 and IMG2 have been merged, the image of the product 4 concerned is complete and accurate, particularly the totality of its contours and the totality of its reliefs, and, as stated before, its volumes. These data can then be compared to theoretical data from a set of specifications in order to check the quality of these products 4: shapes, dimensions, relief size, etc. It should be noted that, in this case, a traditional linear or matrix camera can supplement the inspection device by acquiring images in grey levels giving information on the surface condition of said products 4 (condition after baking for example).

It should be noted that, as indicated above, by calculating the volumes of the objects detected by cameras 10 and 12 the invention enables the products 4 moving on the conveyor belt 3 to be counted, whether or not there are partial or total overlaps of some of said products 4. FIG. 4 schematically illustrates the complete architecture of an apparatus 6 for controlling and sorting industrially baked products 4 or the like employing a laser triangulation visiometry system of the type described with regard to FIG. 3, i.e. having two cameras 10 and 12. Classically, the apparatus 6 has a conveyor belt 3. According to the particular embodiment of the invention illustrated in FIG. 5, the conveyor belt 3 is divided into three parts: a downstream conveyor belt 32, an intermediate conveyor belt 31 of which at least part is a viewing zone for cameras 10 and 12, and an upstream conveyor belt 30, all arranged cascade-wise in planes slightly offset heightwise downward in the downstream direction. The assembly is disposed in a frame 60 resting on the ground S.

Advantageously, each of the upstream, intermediate, and downstream conveyor belts has classical drive means, for example rollers (300 and 301 respectively for upstream conveyor belt 30; 310 and 311 for intermediate conveyor belt 31; and 320 and 321 for upstream conveyor belt 32) as well as motors (not shown in FIG. 5).

The products 4 to be inspected are disposed, probably in bulk, on the upstream conveyor belt 30 by any appropriate feed device (not shown). They are then poured onto the conveyor belt 31 and pass through the lamellar laser beam 110. Cameras 10 and 12 acquire images of the line of light 111 generated by the laser beam 110, which line of light is deformed by shape variations in the products 4 moving on the viewing zone of the conveyor belt 31 past said laser beam 110.

The acquired images are processed by the electronic visiometry system signal processing means in the manner described above, either locally (in each camera 10 and 12) or in remote circuits (not shown). In all cases, the "image" signals (coordinates u, v and intensity w) are converted into object signals (coordinates x, y, and z) and sent to a computer system (not shown) for post-processing.

The apparatus 6 also has a switching and ejection device 7 located between the intermediate conveyor belt 31 and the downstream conveyor belt 32. This may be, as a non-limiting example, a comb device similar of itself to those described in French patent FR 2,860,581 B1. The conveyor belt 31 can also be of the retractable type.

Knowing the travel speed of the conveyor belt 31 and the lateral position of a product 4 when it passes into the viewing zone (coordinate X: FIGS. 2A and 2B), it is easy to calculate the time taken by this product to reach the switching and ejection device 7. That time can also be calculated from the information delivered by a coding wheel. The switching device can comprise a single deflector plate or a plurality of deflector plates each moved rotationally between two end positions by an actuator about an axis. The aforesaid computer system then processes the selective-control signals of said deflector plates in a direction parallel to the X axis so that the product 4 opposite the plate in question can be directed according to whether or not it has characteristics conforming to preset criteria.

In the case where the invention is applied to the counting of products 4, a given number of products 4 can be directed selectively to a classical packing or packaging device. Where the invention is applied to quality control of products 4, products found to meet preset criteria (shapes, sizes, etc.) may be selectively directed, by tilting of the corresponding deflector plates to their first end positions, to classical baking or packing devices, and products found not to conform to said criteria can be selectively directed to a rejection line by tilting of the corresponding deflector plates to their second end positions.

In the preferred embodiment illustrated in FIG. 4, the camera viewing station can be supplemented by a viewing station with a classical camera of the linear or matrix type. This camera is numbered 9. It acquires grey-level images and supplements the information on the characteristics of the products 4 traveling in this viewing zone. Hence, the variations in light intensity can be monitored inside the surface of product 4 (an area termed the "useful area") and only in this area. Such an arrangement offers for example the opportunity to check after baking by inspecting the surface appearance of the products 4.

By reading the foregoing it will easily be seen that the invention indeed achieves its goals, particularly that of avoiding evaluation errors due to the presence on the conveyor belt of traces of contaminants, for example flour, and avoiding measuring artefacts resulting therefrom. It also enables the products traveling on the conveyor belt to be accurately and reliably counted at high speed, and it ensures in particular that in case some error occurs, those will be in the direction of over-counting errors (an extra product in the lot) rather than in the direction of sub-counting errors (a product missing in the lot). Indeed, the client in the field concerned will accept over-counting errors whereas he will claim for damages every time a sub-counting error occurs.

The invention claimed is:

1. A method for grouping individual products into lots at an end of an industrial production line along which the individual products travel on a conveyor belt through a viewing zone of a visiometry station, the method comprising:

acquiring images from a line of light projected onto the viewing zone by a lamellar laser beam by means of a camera observing the line of light at a non-zero angle so as to detect an image of the line of light as deformed by a presence of products on the conveyor belt; and determining, by automatically processing height information on the products thus acquired according to the products' location on the conveyor belt, surface areas on which the height information is greater than a given maximum threshold, which corresponds to at least two products are overlapping, and taking the surface areas into account when calculating a number of products that have crossed the viewing zone in order to automatically command sorting elements of a station that groups the products into lots containing the products in predetermined quantities.

2. The method according to claim 1, wherein the height information is additionally compared to a minimum height threshold that discriminates between a presence of at least one of the products on a background from foreign material such as flour in a system for grouping industrially baked products into lots.

3. The method according to claim 1, further comprising:

correlating the images acquired by the camera with the images acquired by a second camera disposed essentially symmetrically to the first camera relative to a plane of the laser lamellar beam.

4. The method according to claim 3, further comprising:

calibrating the camera and the second camera by means of a single calibration tool.

5. The method according to claim 1, further comprising:

comparing shapes and dimensions of the products with preset quality criteria.

6. An apparatus for grouping individual traveling products into lots, the apparatus comprising:

a conveyor belt moving the traveling products through a viewing zone on the conveyor belt;

a laser triangulation visiometry system having at least one camera for observing the viewing zone;

a lamellar laser beam device configured to emit a lamellar laser beam; an electronic image processing device configured to deduce height information on the products present on the belt inspected by the camera from a line of light generated by the laser beam on the viewing zone as deformed by a passage of the products in the viewing zone in combination with information on a location of the products on the belt;

computer device producing, from the location information and height information, a comparison of the height information on the products with a maximum height threshold predetermined to be representative of a presence of a single product, as well as a calculation of a number of the products taking any overlaps into account; and a device configured to switch and sort that is controlled by the computer device to direct the products to appropriate areas according to the results of the calculation.

7. The apparatus according to claim 6, further comprising:

a third camera configured to acquire grey-level images of the products and compare the products' surface appearance with predefined quality criteria.

8. The apparatus according to claim 7, comprising being used for processing industrially baked products.

* * * * *